(12) United States Patent
Piontek et al.

(10) Patent No.: US 12,173,819 B2
(45) Date of Patent: Dec. 24, 2024

(54) PIPE COUPLING GASKET ASSEMBLY

(71) Applicant: Total Piping Solutions, Inc., Olean, NY (US)

(72) Inventors: Daryl M. Piontek, Great Valley, NY (US); Raymond C. Minich, Bradford, PA (US)

(73) Assignee: Dresser Water, LLC, Houston, TX (US)

( * ) Notice: Subject to any disclaimer, the term of this patent is extended or adjusted under 35 U.S.C. 154(b) by 0 days.

(21) Appl. No.: 17/919,061

(22) PCT Filed: Apr. 21, 2021

(86) PCT No.: PCT/US2021/028360
§ 371 (c)(1),
(2) Date: Oct. 14, 2022

(87) PCT Pub. No.: WO2021/216681
PCT Pub. Date: Oct. 28, 2021

(65) Prior Publication Data
US 2023/0167929 A1    Jun. 1, 2023

Related U.S. Application Data

(60) Provisional application No. 63/013,338, filed on Apr. 21, 2020.

(51) Int. Cl.
*F16L 21/02* (2006.01)
*F16J 15/06* (2006.01)
*F16J 15/10* (2006.01)
*F16L 21/06* (2006.01)
*F16L 21/03* (2006.01)

(52) U.S. Cl.
CPC .......... *F16L 21/022* (2013.01); *F16J 15/061* (2013.01); *F16J 15/104* (2013.01); *F16L 21/065* (2013.01); *F16L 21/03* (2013.01)

(58) Field of Classification Search
CPC ....... F16L 21/03; F16L 21/022; F16L 21/065; F16J 15/061; F16J 15/104
See application file for complete search history.

(56) References Cited

U.S. PATENT DOCUMENTS 3,700,008 A * 10/1972 Hackman ................ F16L 21/06
285/373
4,391,458 A    7/1983 Blakeley
4,664,428 A * 5/1987 Bridges ................ F16L 21/005
285/373

(Continued)

*Primary Examiner* — James M Hewitt, II
(74) *Attorney, Agent, or Firm* — Harter Secrest & Emery LLP

(57) ABSTRACT

A conduit coupling assembly having an arcuate clamp ring having first and second longitudinal edges, a spanner configured to extend across a longitudinal ring gap between the first and second longitudinal edges, a connecting assembly configured to tighten the spanner and clamp ring to the fluid conduit from a non-actuated position to a tightened position, an arcuate gasket configured to be positioned between the clamp ring and spanner on an outer side of the gasket and the fluid conduit on an inner side of the gasket, and the gasket comprising a spanner recess in the outer side of the gasket configured to receive at least a portion of the spanner.

9 Claims, 6 Drawing Sheets

(56) References Cited

U.S. PATENT DOCUMENTS

| | | | |
|---|---|---|---|
| 5,765,876 A * | 6/1998 | Bridges | F16L 55/172 |
| | | | 285/15 |
| 6,168,210 B1 | 1/2001 | Bird | |
| 7,654,586 B2 | 2/2010 | Krausz et al. | |
| 8,528,945 B2 * | 9/2013 | Bird | F16L 21/04 |
| | | | 285/369 |
| 8,776,351 B2 | 7/2014 | Bird et al. | |
| 11,255,473 B2 * | 2/2022 | Mitchell | F16B 7/0426 |
| 2009/0189392 A1 | 7/2009 | Ignaczak | |
| 2010/0327576 A1 | 12/2010 | Linhorst et al. | |
| 2012/0205909 A1 | 8/2012 | Bird | |
| 2017/0051854 A1 | 2/2017 | Bird | |
| 2020/0271253 A1 | 8/2020 | Cumic et al. | |

* cited by examiner

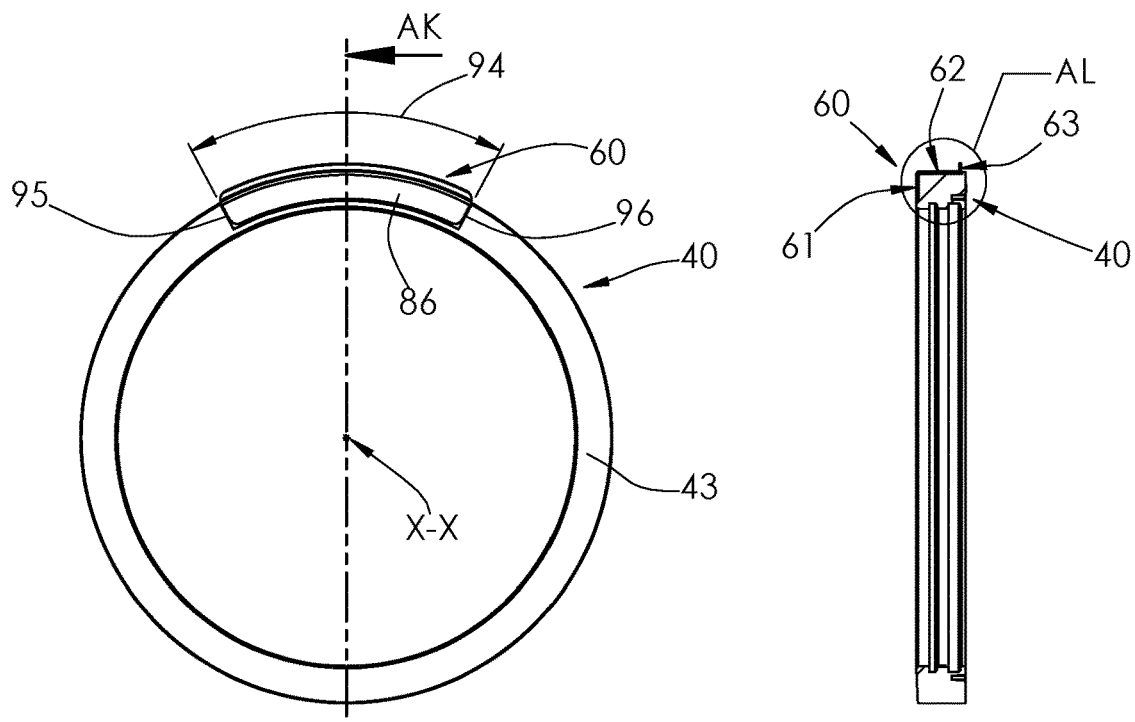
FIG. 8
FIG. 9
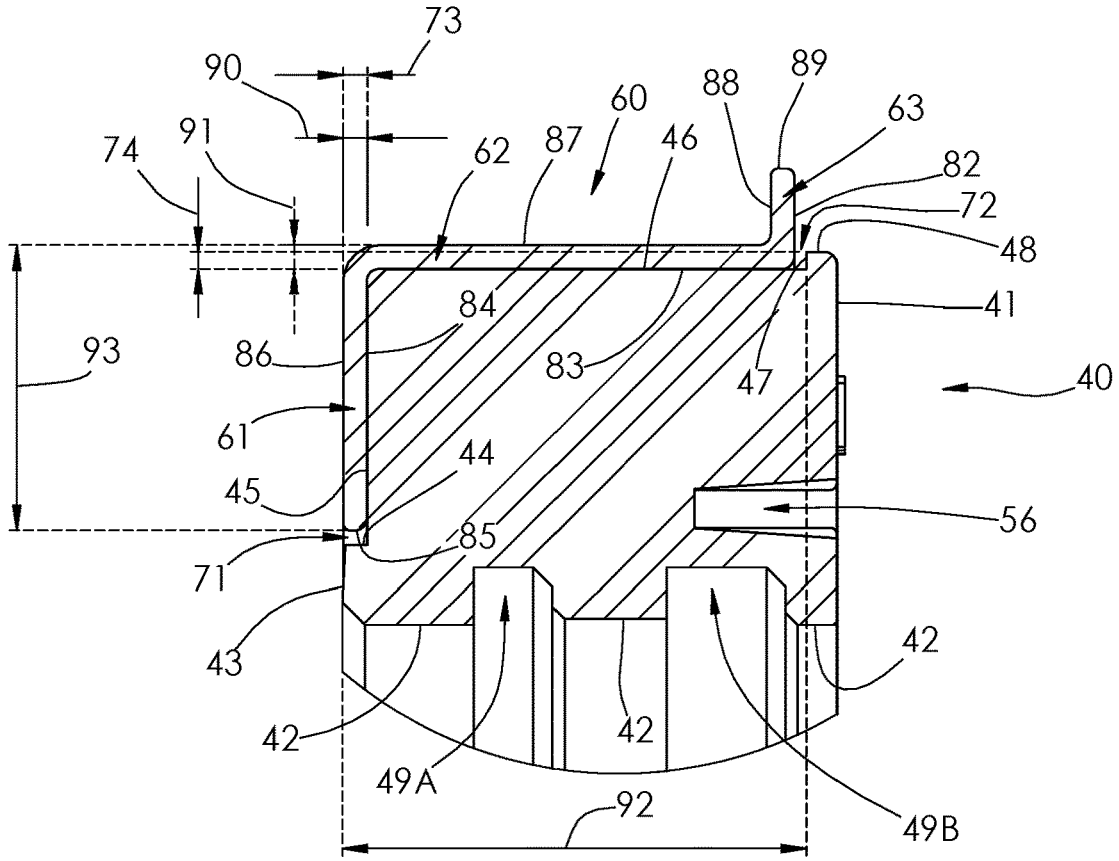
FIG. 10

PIPE COUPLING GASKET ASSEMBLY

TECHNICAL FIELD

The present invention relates generally to the field of fluid conduit repair and couplings, and more particularly to an improved pipe coupling gasket assembly.

BACKGROUND ART

Split repair and encapsulating sleeves or clamps are used in the repair or reinforcement of pipes. For example, conventional assemblies for coupling and sealing adjacent ends of two adjacent pipe sections include a sleeve, shell, ring or collar with each pipe end extending into a respective end of the sleeve. Gaskets are placed between the sleeve and each pipe end, respectively, such that tightening the sleeve to the pipe sections compresses the gasket against the pipe ends, thereby sealing the pipe coupling to the pipes.

U.S. Pat. No. 6,168,210, entitled "Pipe Coupling," discloses a sleeve, flanges and gaskets that are coupled together via bolts to compress the gaskets against pipe ends as the flanges are drawn towards each other. U.S. Pat. No. 4,391,458, entitled "Pipe Coupling With Gasket Locating Means," discloses a pipe coupling having a split housing surrounding a split-ring gasket. U.S. Patent Application Publication No. 2010/0327576, entitled "Pipe Coupler and Gasket With Positive Retention and Sealing Capability," discloses a coupler which provides positive retention of a gasket about the circumference of the coupler. U.S. Pat. No. 8,776,351, entitled "Split-Ring Gland Pipe Coupling With Corrugated Armor," discloses a pipe coupling for coupling adjacent ends of a pair of pipes that includes a sleeve, a split-ring gland positioned around one of the ends of the sleeve, and an annular gasket positioned within the split-ring gland and configured to be compressed by the split-ring gland for sealing one pipe end to the sleeve. U.S. Pat. No. 7,654,586, entitled "Pipe Seal Element," is directed to a gasket that maintains contact with a pipe and a flange during and after seal compression.

BRIEF SUMMARY OF THE INVENTION

With parenthetical reference to corresponding parts, portions or surfaces of the disclosed embodiment, merely for the purposes of illustration and not by way of limitation, an improved conduit coupling assembly (15) configured to clamp to a fluid conduit (19) oriented about a longitudinal axis (x-x) is provided comprising: an arcuate clamp ring (16) having a first longitudinal edge (28A) and a second longitudinal edge (28B); a spanner (60) configured to extend across a longitudinal ring gap (29) between the first longitudinal edge (28A) and the second longitudinal edge (28B) of the clamp ring (16); a connecting assembly (18) configured to tighten the spanner (60) and the clamp ring (16) to the fluid conduit (19) from a non-actuated position to a tightened position; an arcuate gasket (25) configured to be positioned between the clamp ring (16) and the spanner (60) on an outer side (40, 48) of the gasket (25) and the fluid conduit (19) on an inner side of the gasket (42, 42); and the gasket comprising a spanner recess (70) in the outer side (40, 48) of the gasket (25) configured to receive at least a portion (61, 62) of the spanner (60).

The gasket (25) may comprise an outer cylindrical arc surface (48) and the spanner recess (70) may comprise a radial recess (72) in the outer cylindrical arc surface (48) of the gasket (25) configured to receive at least a portion (62) of the spanner (60). The radial recess (72) of the spanner recess (70) may have a radial depth (74); the spanner (60) may comprise a cylindrical arc portion (62) having a radial thickness (91); and the radial recess (72) and the cylindrical arc portion (62) may have a radial depth to radial thickness ratio (74/91) of between about 0.5 and about 0.9. The radial recess (72) of the spanner recess (70) may have an axial width (76); the spanner (60) may comprise a cylindrical arc portion (62) having an axial length (92); and the radial recess (72) and the cylindrical arc portion (62) may have an axial width to axial length ratio (76/92) of between about 1.01 and about 1.5.

The gasket (25) may comprise an outer end wall (43) and the spanner recess (70) may comprise an axial recess (71) in the outer end wall (43) of the gasket (25) configured to receive at least a portion (61) of the spanner (60). The axial recess (71) of the spanner recess (70) may have an axial depth (73); the spanner may comprise an annular arc portion (61) having an axial thickness (90); and the axial recess (71) and the annular arc portion (61) may have an axial depth to axial thickness ratio (73/90) of between about 0.9 and about 1.1. The axial recess (71) may have a radial width (75); the spanner (60) may comprise an annular arc portion (61) having a radial length (93); and the axial recess (71) and the annular arc portion (61) may have a radial width to radial length ratio (75/93) of between about 1.01 and about 1.5.

The spanner (60) may have a spanner arc length (94) transverse to the longitudinal axis (x-x) from a first edge (95) to a second edge (96) of the spanner (60); the spanner recess (70) may have a recess arc length (77) transverse to the longitudinal axis (x-x) from a first edge (78) to a second edge (79) of the spanner recess (70); and the spanner recess (70) and the spanner (60) may have a recess arc length to spanner arc length ratio (77/94) of between about 1.01 and about 1.5.

The gasket (25) may comprise an outer gasket layer (40) and a separate inner gasket layer (30) and the inner and outer gasket layers may be configured to be selectively engaged (49A, 39A, 49B, 39B) with each other.

BRIEF DESCRIPTION OF THE DRAWINGS

FIG. 8 is a left end view of the end gasket and end spanner shown in FIG. 6.

FIG. 9 is a longitudinal vertical cross-sectional view of the end gasket and end spanner shown in FIG. 8, taken generally on line AK-AK of FIG. 8.

FIG. 10 is an enlarged longitudinal vertical cross-sectional view of the end gasket and end spanner shown in FIG. 9, taken generally within the indicated circle AL of FIG. 9.

DETAILED DESCRIPTION OF THE EMBODIMENTS

Figure 1:
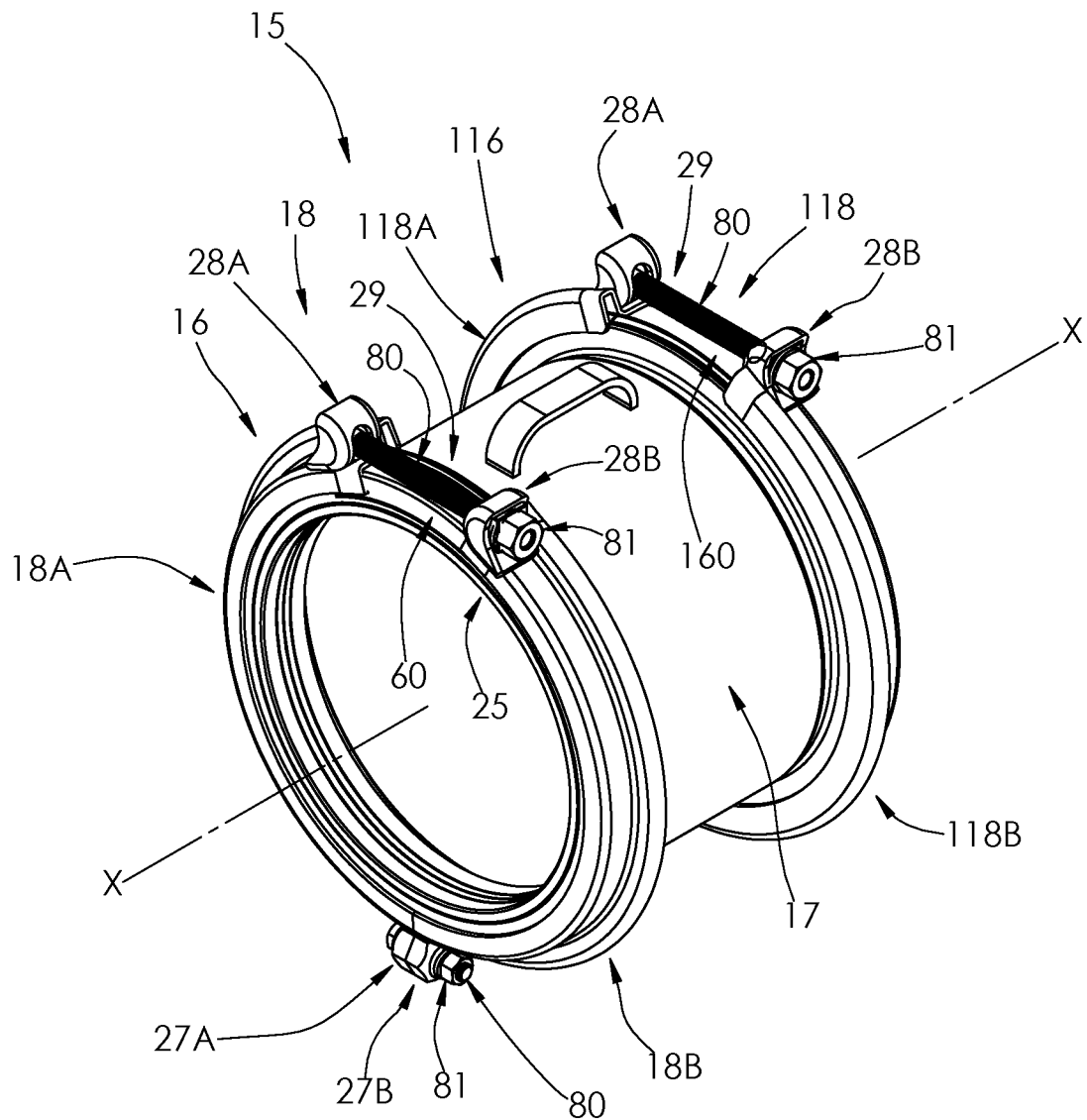
FIG. 1 is a perspective view of an embodiment of the improved assembly.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 2:
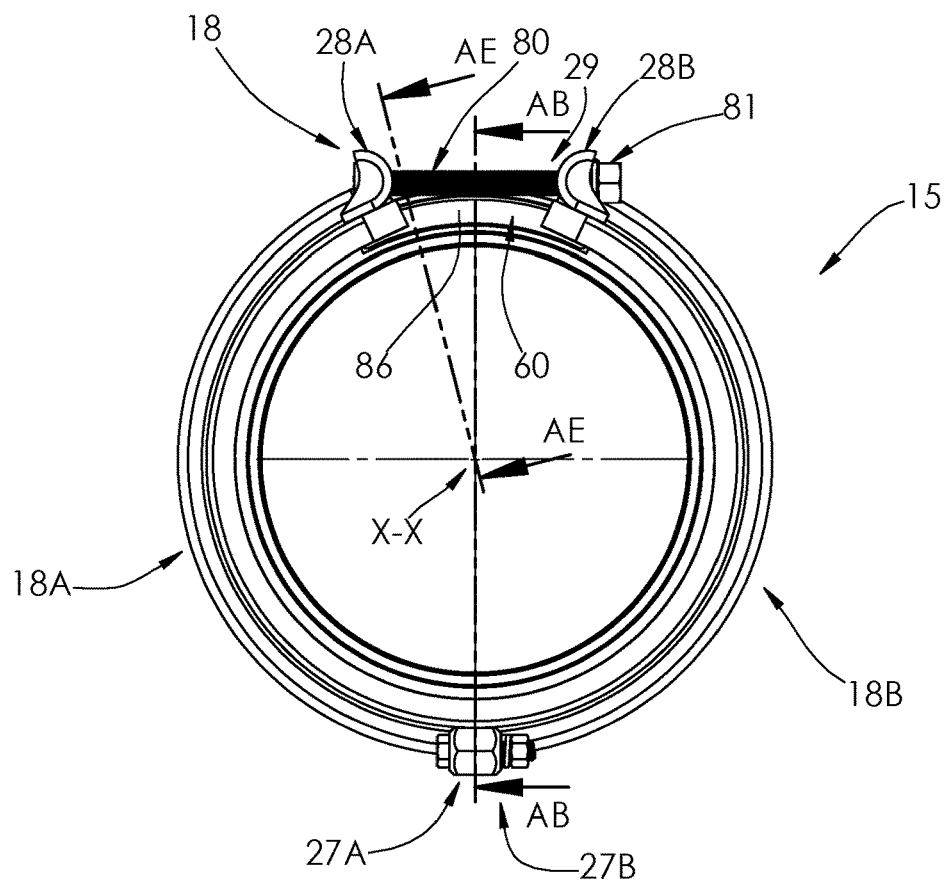
FIG. 2 is a left end view of the assembly shown in FIG. 1.
Figure 3:
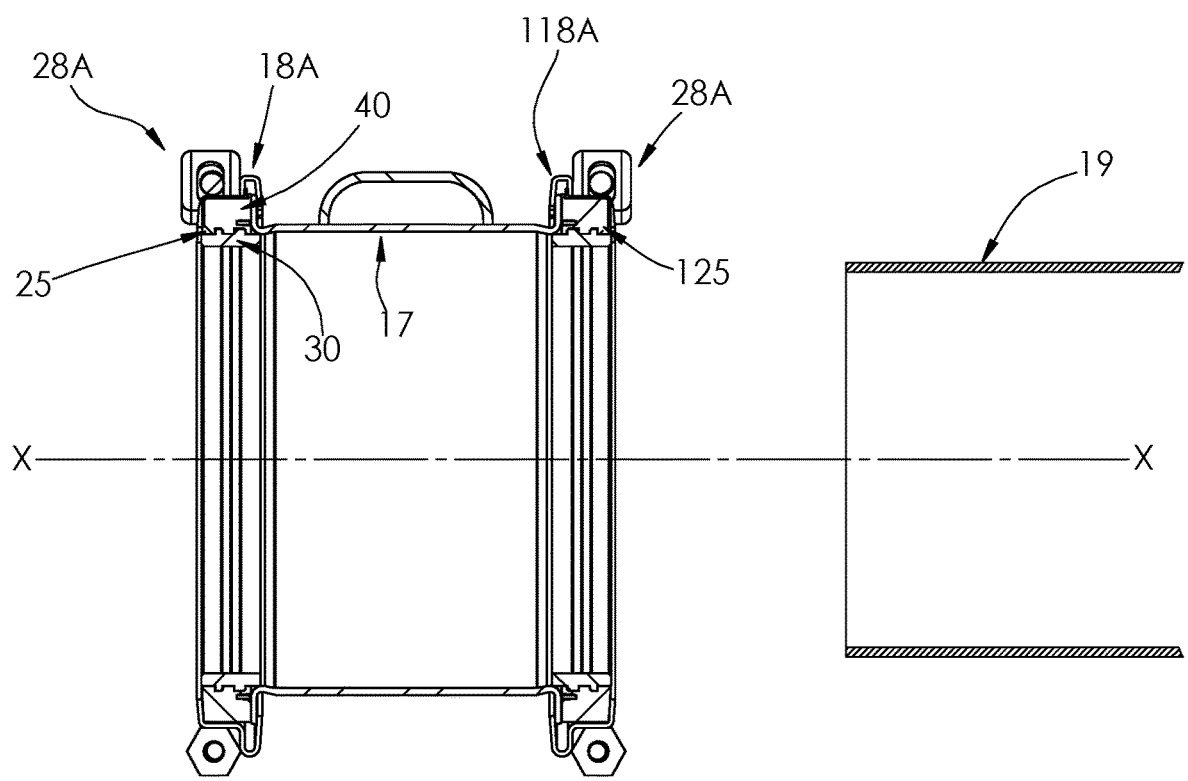
FIG. 3 is a longitudinal vertical cross-sectional view of the assembly shown in FIG. 2, taken generally on line AB-AB of FIG. 2.
Figure 4:
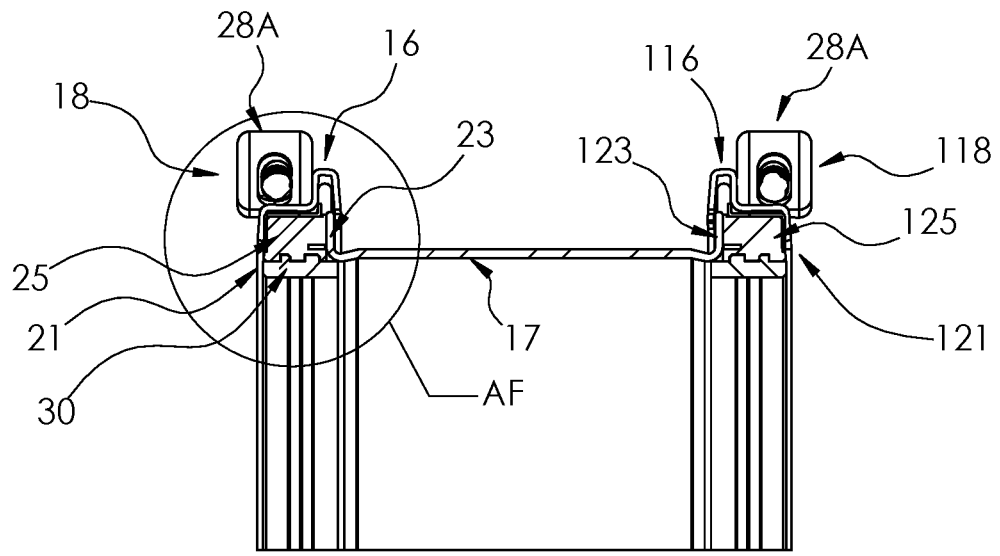
FIG. 4 is a partial longitudinal cross-sectional view of the assembly shown in FIG. 2, taken generally on line AE-AE of FIG. 2.

Referring now to the drawings, and more particularly to FIGS. 1-3 thereof, an improved pipe coupling assembly is provided, of which a first embodiment is generally indicated at 15. As shown, assembly 15 generally comprises middle encapsulation sleeve or ring 17 and two end ring gasket assemblies comprising end rings 16 and 116, end spanners 60 and 160, and end gaskets 25 and 125, respectively, which surround pipe 19. Middle ring 17, end rings 16 and 116, end gaskets 25 and 125 and pipe 19 are all generally ring-like cylindrical structures orientated about axis x-x. In operation, middle ring 17 and end rings 16 and 116 and end gaskets 25 and 125 are circumferentially disposed on the outside of pipe 19.

End rings 16 and 116 overlap the respective annular flanged edges 23 and 123 of middle ring 17. End ring 16 includes semi-cylindrical half ring 18A and semi-cylindrical half ring 18B, which are bolted together via tightening assembly 18 to encapsulate pipe 19. Semi-cylindrical half ring 18A and semi-cylindrical half ring 18B include abutting ends 27A and 27B and spaced ends 28A and 28B, respectively. Abutting ends 27A and 27B are configured to be securely coupled together in a generally gap-free relationship as shown in FIG. 1. With abutting ends 27A and 27B coupled via bolt 80 and nut 81, spaced ends 28A and 28B define a variable gap 29 therebetween. Spaced end 28A of half ring 18A includes a first bolt lug projecting radially outwardly from spaced end 28A. Similarly, spaced end 28B of half ring 18B includes a second bolt lug projecting radially outwardly from spaced end 28B. Half ring 18A and half ring 18B are thereby connected and tightened around pipe 19 via bolt 80, extending between openings in the respective lugs, and corresponding nut 81. Similarly, end ring 116 includes semi-cylindrical half ring 118A and semi-cylindrical half ring 118B, which are bolted together via tightening assembly 118 to encapsulate pipe 19. Half ring 118A and half ring 118B are thereby connected and tightened around pipe 19 via bolt 80 and corresponding nut 81.

End gaskets 25 and 125 are configured to wrap around and encircle pipe 19 between the outer surface of pipe 19 and inner pockets 21 and 121 of end rings 16 and 116, respectively, of assembly 15 to form a seal, with end gaskets 25 and 125 sealing on pipe 19. Assembly 15 is thereby configured and arranged to be tightened around pipe 19.

End gaskets 25 and 125 have specially contoured features and are disposed generally between the inner annular surfaces of end rings 16 and 116 and end spanners 60 and 160, the inner cylindrical surfaces of rings 16 and 116 and end spanners 60 and 160, the outer annular surface of flanges 23 and 123 of middle ring 17, respectively, and the outer cylindrical surface of pipe 19. Thus, end gaskets 25 and 125 are sandwiched between the inside cylindrical surfaces of end rings 16 and 116 and end spanners 60 and 160 and the outside cylindrical surface of conduit 19 to provide sufficient sealing force to prevent leakage of fluid. Elastic or sealing energy is imparted into assembly 15 by tightening end rings 16 and 116 from a loosened or a non-actuated position to a tightened sealed position.

As shown in FIGS. 1-7, each of end gaskets 25 and 125 comprises two nested gasket split-ring layers 30 and 40 that can be separated from each other. Each end gasket 25 and 125 comprises outer gasket split-ring 40 and removable inner gasket split-ring 30. Inner split-ring or layer 30 may be removed from outer split-ring or layer 40.

Figure 13:
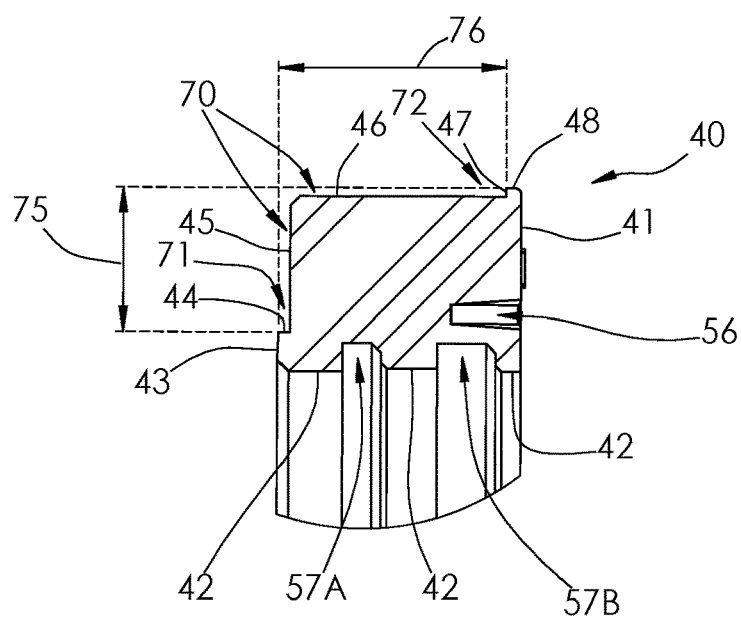
FIG. 13 is an enlarged partial longitudinal vertical cross-sectional view of the end gasket shown in FIG. 12, taken generally within the indicated circle AH of FIG. 11.

As shown in FIG. 13, outer split ring gasket 40 is a specially-configured ring-shaped solid penannular member elongated along axis x-x, and is generally bounded by rightwardly-facing vertical annular surface 41, inwardly-facing horizontal cylindrical surface 42, leftwardly-facing vertical annular surface 43, outwardly-facing horizontal cylindrical arc surface 44, leftwardly-facing vertical annular arc surface 45, outwardly-facing horizontal cylindrical arc surface 46, leftwardly-facing vertical annular arc surface 47, and outwardly-facing horizontal cylindrical surface 48, joined at its right marginal end to the outer marginal end of surface 41.

As shown, surface 41 includes annular pressure assist cavity 56 to aid in sealing to pipe 19 under compressive pressure, and surface 42 includes first annular channel 49A extending into surface 42 and second annular channel 49B extending into surface 42. Surfaces 44, 45, 46 and 47 define end spanner recess 70 in outer annular surface 43 and outer cylindrical surface 48 of outer gasket 40, with recess 70 configured to receive outer leg 61 and middle leg 62 of end spanner 60.

Figure 7:
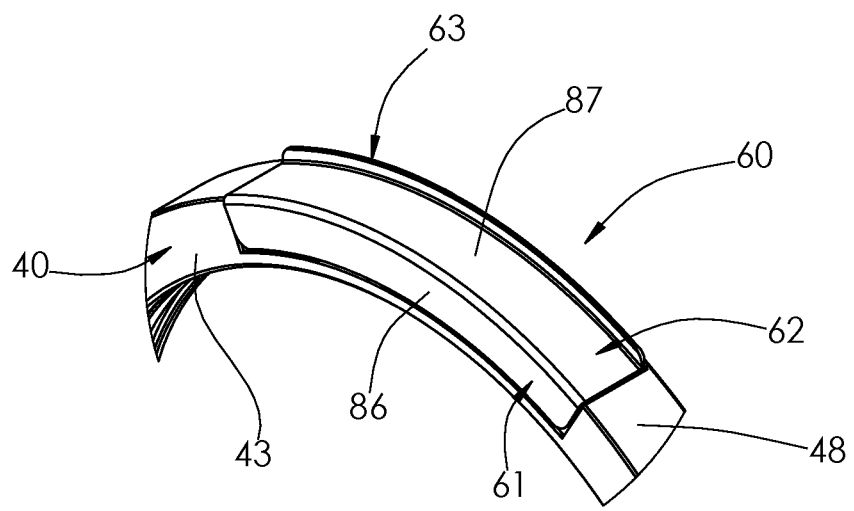
FIG. 7 is an enlarged perspective view of the end gasket and end spanner shown in FIG. 6, taken generally within the indicated circle AI of FIG. 6.
Figure 11:
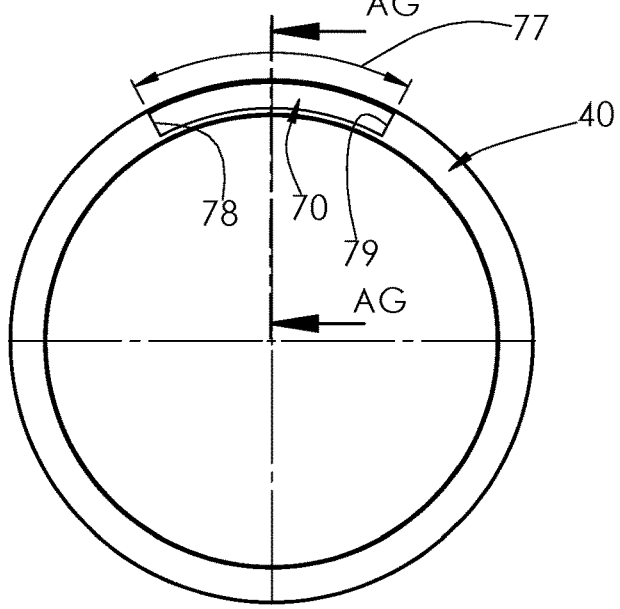
FIG. 11 is a left end view of the end gasket shown in FIG. 6.
Figure 12:
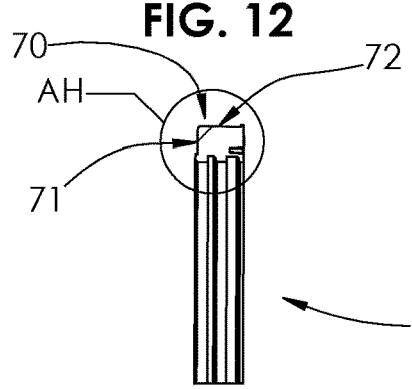
FIG. 12 is a partial longitudinal vertical cross-sectional view of the end gasket shown in FIG. 11, taken generally on line AG-AG of FIG. 11.

As shown in FIG. 7, inner split ring gasket 30 is a specially-configured ring-shaped solid penannular member elongated along axis x-x and is generally bounded by rightwardly-facing vertical annular surface 31, inwardly-facing horizontal cylindrical surface 32, leftwardly-facing vertical annular surface 33, and outwardly-facing horizontal cylindrical surface 34, joined at its right marginal end to the outer marginal end of surface 31. As shown, surface 34 includes first spline 39A extending outwardly from surface 34 and second spline 39B extending outwardly from surface 34.

Splines 39A and 39B of inner gasket 30 are orientated in a plane substantially perpendicular to axis x-x and mate with channels 49A and 49B of outer gasket 40, respectively. Inner gasket split-ring 30 is manually removable from outer gasket split-ring 40 to allow end gaskets 25 and 125 to be installed on an oversize pipe. Inner split-ring 30 and outer split-ring 40 are loosely connected to each other via annular splines 39A and 39B of inner gasket 30 being nested in annular channels 49A and 49B, respectively, such that inner split-ring 30 is adapted to be removed from outer split-ring 40 at a predetermined location. This allows end gaskets 25 and 125 to be used with pipes of substantially different diameters. For pipes of greater outer diameter, inner split-ring 30 is manually separated from outer split-ring 40 and just outer split-ring 40 is used as the end gasket.

As shown, inner gasket layer 30 has an axial width between side surfaces 31 and 33 that is greater than the axial width between side surfaces 41 and 43 of outer gasket layer 40. As shown, outer split-ring 40 does not entirely overlap inner split-ring 30. Inner split-ring 30 has outer axial width along axis x-x and outer split ring 40 has outer axial width along axis x-x less than the axial width of inner split ring 30.

Split-ring end gaskets 25 and 125 are formed of a resilient material and are cut radially so as to be penannular and not form a full ring. Thus, instead of being a full continuous annular ring, a radial break or gap is provided through each layer 30 and 40 at a circumferential location. Thus, each layer 30 and 40 has a radial split through the entire gasket cross-section. The edges of the gap may thereby be manually separated or pulled apart from each other to form a more open C-shaped member. Once installed on pipe 19, the opposed ends of the split-ring gasket layers 30 and 40 will move back towards each other and the gap will close up.

Figure 5:
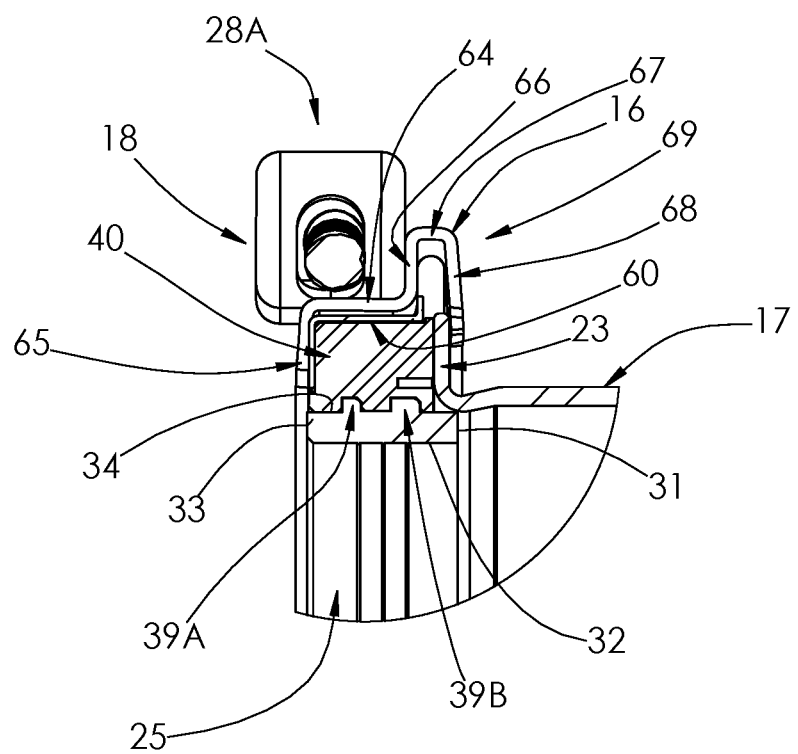
FIG. 5 is a partial longitudinal cross-sectional view of the assembly shown in FIG. 4, taken generally within the indicated circle AF of FIG. 4.
Figure 6:
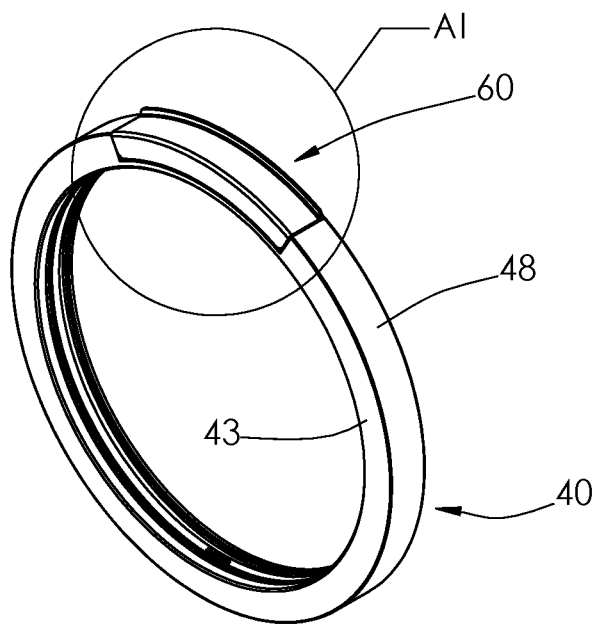
FIG. 6 is a perspective view of the end gasket and end spanner shown in FIG. 1.

As shown in FIG. 5, end ring 16 includes cylindrical horizontal center portion 64 with an inner end and an outer end, inwardly-facing U-shaped groove portion 69 (defined by annular vertical portion 66, cylindrical horizontal portion 64, and annular vertical portion 66) extending radially outward from the inner end of center portion 64, and annular outer portion 65 extending radially inward from the outer end of center portion 64. U-shaped portion 69 is configured to axially and radially overlap annular flange 23 of middle ring 17. At least a portion of gasket 25 is captured axially between outer portion 65 of end ring 16 and flange 23 of middle ring 17. At least a portion of gasket 25 is captured radially between center portion 64 of end ring 16 and pipe 19. Thus, outer portion 65 of end ring 16, center portion 64 of end ring 16, and flange 23 of middle ring 17 collectively define gasket seat 21 for split-ring gasket 25.

To bridge gap 29 that is formed between spaced ends 28A and 28B of end ring 16, end spanner plate 60, placed in recess 70 on the outside of gasket 25 and orientated transverse to axis x-x, is employed to provide gasket compression across gap 29. As shown in FIG. 10, end spanner 60 is generally S-shaped in cross section and has an arcuate shape along its length 94 and is generally bounded by rightwardly-facing vertical annular arc surface 82, inwardly-facing horizontal cylindrical arc surface 83, rightwardly-facing vertical arc surface 84, inwardly-facing horizontal cylindrical arc end surface 85, leftwardly-facing vertical annular arc surface 86, outwardly-facing horizontal cylindrical arc surface 87, leftwardly-facing vertical annular arc surface 88, and outwardly-facing horizontal cylindrical arc end surface 89, joined at its right marginal end to the outer marginal end of surface 82. Thus, opposed surfaces 83 and 87 define center arcuate leg 62, surfaces 84, 85 and 86 define outside arcuate leg 61 extending generally perpendicular to, and radially inwardly of, center leg 62 at the outside end of center leg 62, and surfaces 88, 89 and 82 define inside arcuate leg 63, extending generally perpendicular to, and radially outwardly of, center leg 62 at the inside end of center leg 62. Inside leg 63 and outside leg 61 extend in differing directions from center leg 62 to form the generally S-shaped cross section of arcuate spanner plate 60. Spanner plate 60 fits in recess 70 in the outer surface of elastomeric gasket 25 and is compressed radially inward by the lugs of spaced ends 28A and 28B of end ring 16.

When end spanner 60 is positioned in gap 29 between spaced ends 28A and 28B of end rings 16 and 116, center leg 62 is positioned radially inward of center portion 64 of rings 16 and 116 at spaced ends 28A and 28B, outside leg 61 is positioned axially inside of outer portion 65 of rings 16 and 116 at spaced ends 28A and 28B, and inside leg 63 is positioned axially inside of, and radially overlaps, annular vertical portion 66 of groove portion 69 of rings 16 and 116 at spaced ends 28A and 28B. End spanner 60 thereby defines an arc length 94 that is at least long enough to span gap 29. And end spanner 60 and split end ring 16 collectively define a closed ring or loop for receiving annular gasket 25. Thus, spanner 60 is a metallic strip that spans arc-shaped gap 29 between opposed edges 28A and 28B of end ring 16. The interior edges and surfaces of end ring 16 that are in contact with spanner 60 apply a normal force or pressure that is directed radially inward toward the center axis of pipe 19, which develops the necessary sealing pressure between spanner 60 and pipe 19. Spanner 60 is designed to compress gasket 25 across gap 29 between longitudinal edges 28A and 28B of end ring 16. The opposed spaced ends 28A and 28B of end ring 16 are intended to slide, translate or slip over outer surface 87 of spanner 60, and thereby provide diameter reduction and gasket compression upon the tightening of connection assembly 18. As nut 81 is tightened on bolt 80 of connection assembly 18, a radially orientated inward force is applied to spanner 60 and the opposed lugs of opposed ends 28A and 28B of end ring 16 are drawn together, thereby tightening assembly 15 to pipe 19.

As shown in FIGS. 6-13, arcuate recess 70 in gasket layer 40 comprises both axial recess portion 71 and radial recess portion 72 that are configured to receive and contain legs 61 and 62 of end spanner 60, respectively. As shown, recess 70 is generally a L-shaped space in cross section and has an arcuate shape along its length 77 and is generally defined by surfaces 44, 45, 46 and 47 of gasket layer 40 of gasket 25. Thus, surfaces 46 and 47 of gasket layer 40 define radial recess portion 72 of recess 70 and surfaces 44 and 45 of gasket layer 40 define axial recess portion 71 extending generally perpendicular to, and radially inwardly of, radial recess portion 72 at the outside end of radial recess portion 72. As shown, radial recess portion 72 has radial depth 74 inward radially from outer cylindrical surface 48 of gasket layer 40. Axial recess portion 71 has axial depth 73 inward axially from outer annular surface 43 of gasket layer 40. Center leg 62 of spanner has radial thickness 91 between surfaces 83 and 87 and outer leg 61 has axial thickness 90 between surfaces 86 and 84. In this embodiment, radial thickness 91 of center leg 62 of spanner 60 is slightly greater than radial depth 74 of recess 70 of gasket layer 40 and axial thickness 90 of outer leg 61 of spanner 60 is equal to axial depth 73 of recess 70 of gasket layer 40. Abutment between spanner edge 82 and gasket edge 47 maintains axial alignment and position of spanner 60 in gasket layer 40. Such relative depth to thicknesses may be varied as desired. Preferably, the depth to thickness ratio 73/90 of axial recess 71 is between about 0.9 and about 1.1 and the depth to thickness ratio 74/91 of radial recess 72 is between about 0.5 and about 0.9. Thus, the outer sides of gasket layer 40 generally include uniform outer surfaces 43 and 48 and spanner recess 70 in outer surfaces 43 and 48 is sized to receive spanner 60 such that portions of spanner 60 may be embedded or nested into gasket 25. In certain embodiments, such portions of spanner 60 lie flush with surface 43 and/or 48 of the outer sides of gasket 25 and do not project above the outer surfaces of arcuate gasket 25.

Radial recess 72 has axial width 76 between annular arc surface 47 and annular surface 43 of gasket layer 40. Axial width 76 of radial recess 72 may be adjusted relative to axial length 92 of center leg 62 to provide the desired clearance between surfaces 47 and 82 of gasket layer 40 and spanner 60, respectively. Preferably, the width to length ratio 76/92 of radial recess 72 is between about 1.01 and about 1.5.

Axial recess 71 has radial width 75 between cylindrical arc surface 44 and cylindrical surface 48 of gasket layer 40. Radial width 75 of axial recess 71 may be adjusted relative to radial length 93 of outer leg 61 to provide the desired clearance between surfaces 44 and 85 of gasket layer 40 and spanner 60, respectively. Preferably, the width to length ratio 75/93 of axial recess 71 is between about 1.01 and about 1.5.

Spanner 60 has an arc radius about axis x-x and spanner arc length 94 from its left longitudinal edge 95 to its right longitudinal edge 96 transverse to axis x-x and spanner recess 70 has corresponding arc radius and recess arc length 77 from its left longitudinal edge 78 to its right longitudinal edge 79 transverse to axis x-x. Recess arc length 77 of recess 70 may be adjusted relative to spanner arc length 94 of spanner 60 to provide the desired clearance between the opposed left longitudinal edges 95 and 78 and opposed right longitudinal edges 96 and 79 of recess 70 of gasket layer 40 and spanner 60, respectively. Preferably, the recess arc length to spanner arc length ratio 77/94 of recess 70 is between about 1.01 and about 1.5.

The aforementioned clearances may be selected to provide desired volumetric space or clearance for gasket layer 40 to move into as end ring 16 is tightened to pipe 19 and gasket 25 is radially compressed between end ring 16 and pipe 19, facilitating an improved seal.

Gasket recess 70 provides a number of unexpected benefits over the prior art. For example, and without limitation, gasket recess 70 provides clearance for gasket 25 and spanner 60 to fit into the seat 21 of end ring 16, which assists in assembly. Gasket recess 70 locates and positions spanner 60 so that spanner 60 does not move and is retained in recess 70 in gasket layer 40 instead of sliding around relative to gasket layer 40. Gasket recess 70 provides improved control over and uniformity of gasket pressure in the vicinity and region of spanner 60. Gasket recess 70 prevents spanner 60 from digging into or rupturing the outer rubber gasket surfaces 43 and 48 due to otherwise excessive pressure at spanner edges 95, 96, 85 and/or 82. Gasket spanner recess 70 depth relative to spanner thickness can be selected to control overall gasket compression. Gasket recess 70 helps prevent spanner 60 from "snagging" on the inner surfaces and coatings of both center portion 64 and outer portion 65 of end ring 16 so that spanner 60 and end ring 16 will slide freely relative to each other and thereby allow for assembly installation and tightening without interference or snagging. Gasket recess 70 provides for increased seal pressure and seal reliability at spanner 60 and provides an improved circumferential seal when assembly 18 is tightened and assists in the progressive seal that occurs near spanner 60 during installation and bolt tightening.

End ring 116, end spanner 170, and end gasket 125 are configured and function substantially the same as end ring 16, spanner 70 and end gasket 25.

The present invention contemplates that many changes and modifications may be made. Therefore, while forms of the improved coupling assembly have been shown and described, and a number of alternatives discussed, persons skilled in this art will readily appreciate that various additional changes and modifications may be made without departing from the scope of the invention, as defined and differentiated by the claims.

What is claimed is:

1. A conduit coupling assembly configured to clamp to a fluid conduit oriented about a longitudinal axis comprising:
    an arcuate clamp ring having a first longitudinal edge and a second longitudinal edge;
    a spanner configured to extend across a longitudinal ring gap between said first longitudinal edge and said second longitudinal edge of said clamp ring;
    said spanner having a spanner arc length transverse to said longitudinal axis from a first longitudinal edge to a second longitudinal edge;
    a connecting assembly configured to tighten said spanner and said clamp ring to said fluid conduit from a non-actuated position to a tightened position;
    an arcuate gasket configured to be positioned between said clamp ring and said spanner on an outer side of said gasket and said fluid conduit on an inner side of said gasket;
    said gasket comprising a spanner recess in said outer side of said gasket;
    said spanner recess having a recess arc length transverse to said longitudinal axis from a first longitudinal edge to a second longitudinal edge; and
    said spanner recess configured to receive at least a portion of said spanner such that said first longitudinal edge of said spanner and said first longitudinal edge of said recess are opposed to each other and said second longitudinal edge of said spanner and said second longitudinal edge of said recess are opposed to each other.

2. The conduit coupling assembly set forth in claim 1, wherein said gasket comprises an outer cylindrical arc surface and said spanner recess comprises a radial recess in said outer cylindrical arc surface of said gasket configured to receive at least a portion of said spanner.

3. The conduit coupling assembly set forth in claim 2, wherein:
    said radial recess of said spanner recess has a radial depth;
    said spanner comprises a cylindrical arc portion having a radial thickness; and
    said radial recess and said cylindrical arc portion have a radial depth to radial thickness ratio of between about 0.5 and about 0.9.

4. The conduit coupling assembly set forth in claim 2, wherein:
    said radial recess of said spanner recess has an axial width;
    said spanner comprises a cylindrical arc portion having an axial length; and
    said radial recess and said cylindrical arc portion have an axial width to axial length ratio of between about 1.01 and about 1.5.

5. The conduit coupling assembly set forth in claim 1, wherein said gasket comprises an outer end wall and said spanner recess comprises an axial recess in said outer end wall of said gasket configured to receive at least a portion of said spanner.

6. The conduit coupling assembly set forth in claim 5, wherein:
    said axial recess of said spanner recess has an axial depth;
    said spanner comprises an annular arc portion having an axial thickness; and said axial recess and said annular arc portion have an axial depth to axial thickness ratio of between about 0.9 and about 1.1.

7. The conduit coupling assembly set forth in claim 6, wherein:
   said axial recess of said spanner recess has a radial width;
   said spanner comprises an annular arc portion having a radial length; and
   said axial recess and said annular arc portion have a radial width to radial length ratio of between about 1.01 and about 1.5.

8. The conduit coupling assembly set forth in claim 1, wherein
   said spanner recess and said spanner have a recess arc length to spanner arc length ratio of between about 1.01 and about 1.5.

9. The conduit coupling assembly set forth in claim 1, wherein said gasket comprises an outer gasket layer and a separate inner gasket layer and said inner and outer gasket layers configured to be selectively engaged with each other.

* * * * *